(12) United States Patent
Black et al.

(10) Patent No.: US 7,901,224 B1
(45) Date of Patent: Mar. 8, 2011

(54) UTILITY RECEPTACLE APPARATUS FOR USE WITH A WORK SURFACE OR SIMILAR ARTICLE

(75) Inventors: David Black, Orange, CT (US); Glenn Golden, Wallingford, CT (US); Michael Brandstatter, Ansonia, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 0 days.

(21) Appl. No.: 12/633,736

(22) Filed: Dec. 8, 2009

(51) Int. Cl.
*H01R 13/44* (2006.01)
(52) U.S. Cl. .......................................... 439/142; 439/538
(58) Field of Classification Search .................. 439/142, 439/144, 206, 535, 538, 564; 174/66, 67
See application file for complete search history.

(56) References Cited

U.S. PATENT DOCUMENTS

| | | | |
|---|---|---|---|
| 4,654,756 A | 3/1987 | Wilson | |
| 5,230,552 A | 7/1993 | Schipper | |
| 5,231,562 A | 7/1993 | Pierce | |
| 5,575,668 A | 11/1996 | Timmerman | |
| 5,709,156 A | 1/1998 | Gevaert | |
| 6,397,762 B1 | 6/2002 | Goldberg | |
| 6,802,577 B2 * | 10/2004 | Gershfeld | 312/223.3 |
| 6,881,080 B2 | 4/2005 | Macaluso | |
| 7,407,392 B2 | 8/2008 | Cooke | |

* cited by examiner

*Primary Examiner* — Khiem Nguyen
(74) *Attorney, Agent, or Firm* — Raymond A. Nuzzo

(57) ABSTRACT

A utility receptacle apparatus for use with a work surface. The utility receptacle apparatus has a grommet member that has a frame structure. The frame structure has an opening therein and an upper peripheral portion that extends about the opening. The upper peripheral portion has a top side and bottom side wherein the bottom side has a surface for contacting a work surface of an article of furniture. The frame structure includes a front wall, a rear wall and a pair of sidewalls that extend downward from and are attached to the bottom side of the peripheral portion. A lid member is located within the opening of the frame structure and is movably attached to the sidewalls of the frame structure. The utility receptacle apparatus includes a receptacle base member that has a top plate section which has a top side and a bottom side. The top plate section has a pair of oppositely positioned raised sections and a recessed section that is located between the raised sections. Each raised section has at least one opening therein to receive a fastener device to allow the receptacle base member to be attached under a work surface of an article of furniture.

17 Claims, 10 Drawing Sheets

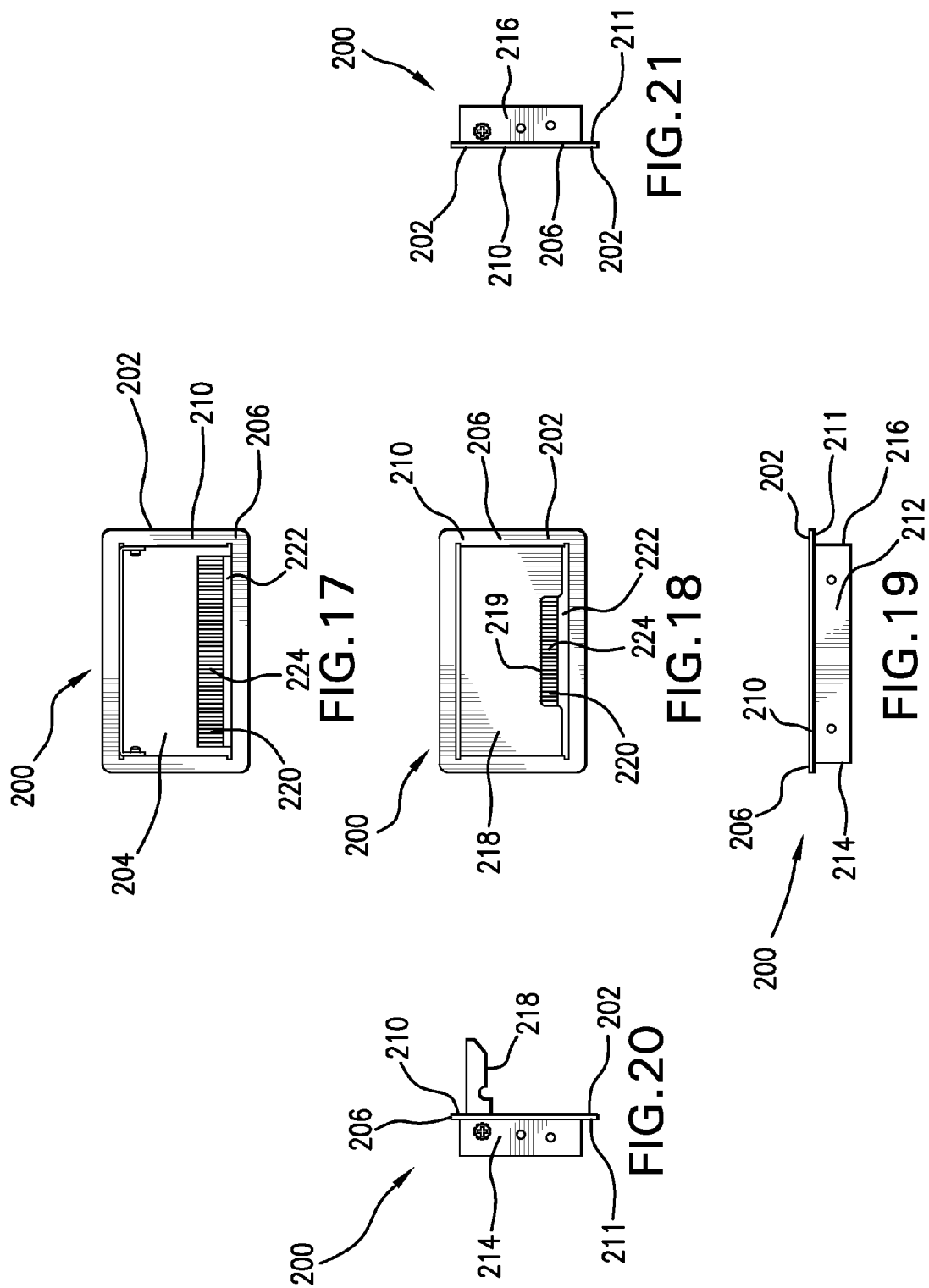

UTILITY RECEPTACLE APPARATUS FOR USE WITH A WORK SURFACE OR SIMILAR ARTICLE

CROSS-REFERENCE TO RELATED APPLICATIONS

None.

TECHNICAL FIELD

The present invention generally relates to a utility receptacle apparatus that can be used with the work surface of an article of furniture such as a table, desk, workbench, workstation or similar article.

BACKGROUND ART

Power and communication outlet units that are mounted to an article of furniture, e.g. desk, table, etc. at a location below the work surface of the article of furniture are known in the art. These power and communication outlet units are typically mounted in a cut-out formed in the work surface of the article of furniture, such as a desk, workbench, table, work station, etc. such that the panel having the power and communication outlets are located below the work surface, but which are easily accessible to a user. The power and communication outlet unit typically has a lid that is used to cover the unit when not in use. The outer surface of the lid functions as a continuation of the work surface when the lid is closed. Thus, the user can actually place equipment or other items right on top of the lid when it is closed. Typical power and communication outlets for use with work surfaces of workbenches, workstations and similar articles of furniture are described in U.S. Pat. Nos. 5,709,156, 5,575,668, and 7,407,392.

DISCLOSURE OF THE INVENTION

The present invention is directed to a utility receptacle apparatus for use with a work surface. The utility receptacle apparatus comprises a grommet member and a receptacle base member. The grommet member comprises a frame structure that comprises an opening therein and an upper peripheral portion that extends about the opening. The upper peripheral portion has a top side and bottom side. The bottom side contacts the work surface of an article of furniture. The grommet member further comprises a front wall, a rear wall and sidewalls that extend downward from and are attached to the bottom side of the peripheral portion. A lid member is located within the opening and movably attached to the sidewalls. In order to mount the grommet member to an article of furniture, an opening is first formed in the article of furniture. The opening in the article of furniture has a shape that is defined by the front, rear and sidewalls of the frame structure, e.g. rectangular, square, etc. The front and rear walls and sidewalls of the frame structure are then inserted into the opening in the article of furniture. When the grommet member is completely mounted to the article of furniture, the bottom side of the upper peripheral portion contacts the work surface of the article of furniture.

The receptacle base member is configured to be attached to the article of furniture such that it is below the work surface but accessible through the opening formed in the word surface. The receptacle base member comprises a top plate section which has a top side and a bottom side. The top plate section comprises a pair of oppositely positioned raised sections and a recessed section that is located between the raised sections. Each raised section has at least one opening therein to receive screws or other fastener devices to allow the receptacle base member to be attached to the underside of the work surface. At least one utility receptacle is connected to the top plate section. In one embodiment, there is a plurality of utility receptacles connected to the top plate section. The receptacle base member comprises an enclosed member that is attached to the bottom side of the top plate section. The enclosed member has a front and rear walls, and left and right side walls. The enclosed member contains wires and conductors that are electrically connected to the utility receptacles. In one embodiment, a power cord is connected to the enclosed member and comprises wires that are electrically connected to the at least one utility receptacle. The power cord is connected to an external power source such as an AC receptacle. In another embodiment, electrical connectors are connected to each sidewall of the enclosed member. The electrical connectors are electrically connected to each other and to the at least one utility receptacle. Each electrical connector is configured to be connected to a source of electrical power. The receptacle base member is mounted to the underside of the work surface of the article of furniture so that the recessed section is positioned under the opening in the work surface of the article of furniture and the at least one utility receptacle is accessible through the opening.

Further features and advantages of the present invention are described in the ensuing description.

DESCRIPTION OF THE DRAWINGS

The present invention will be more readily understandable from a consideration of the accompanying drawings, wherein:

FIG. 17 is a top plan view of a grommet member in accordance with another embodiment of the present invention, the lid member of the grommet member being shown in the open position;

FIG. 18 is another top plan view of the grommet member of FIG. 17, the lid member of the grommet member being shown in the closed position, the view showing a brush member that contacts and supports the lid member when the lid member is in the closed position;

FIG. 19 is a front view of the grommet member of FIG. 17;

FIG. 20 is a view of the right side of the grommet member of FIG. 17; and

FIG. 21 is a view of the left side of the grommet member of FIG. 17.

BEST MODE FOR CARRYING OUT THE INVENTION

Figure 8:
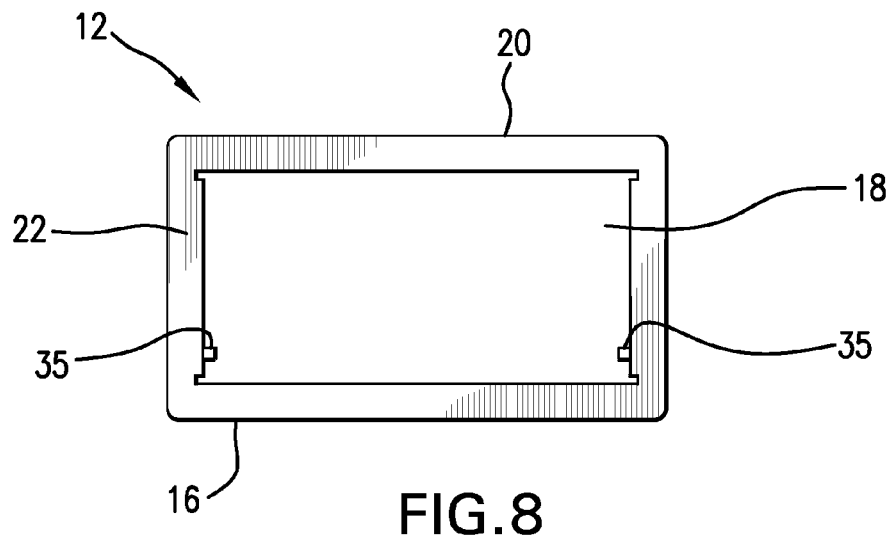
FIG. 8 is a top plan view of the grommet member, the view not showing the lid member so as to facilitate viewing of support members that contact and support the lid member when the lid member with the lid in the closed position.
Figure 9:
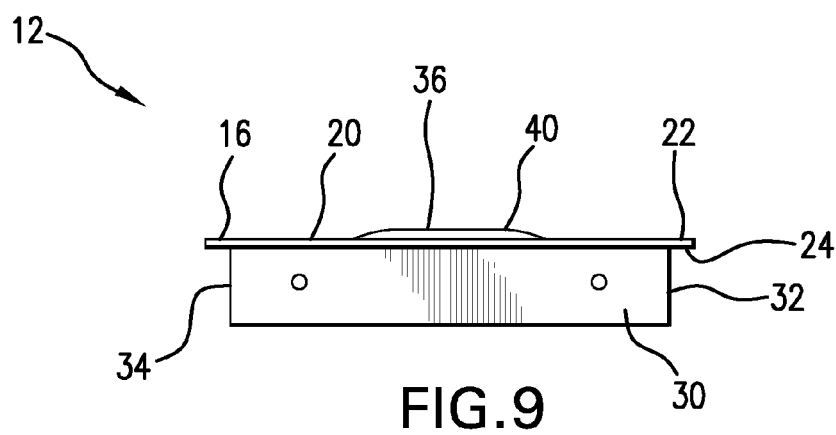
FIG. 9 is a rear view of the grommet member with the lid member in the closed position.
Figure 10:
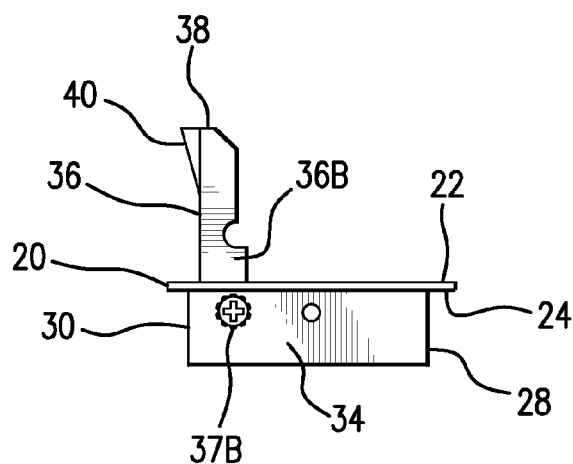
FIG. 10 is a view of the right side of the grommet member with the lid member in the opened position.
Figure 14:
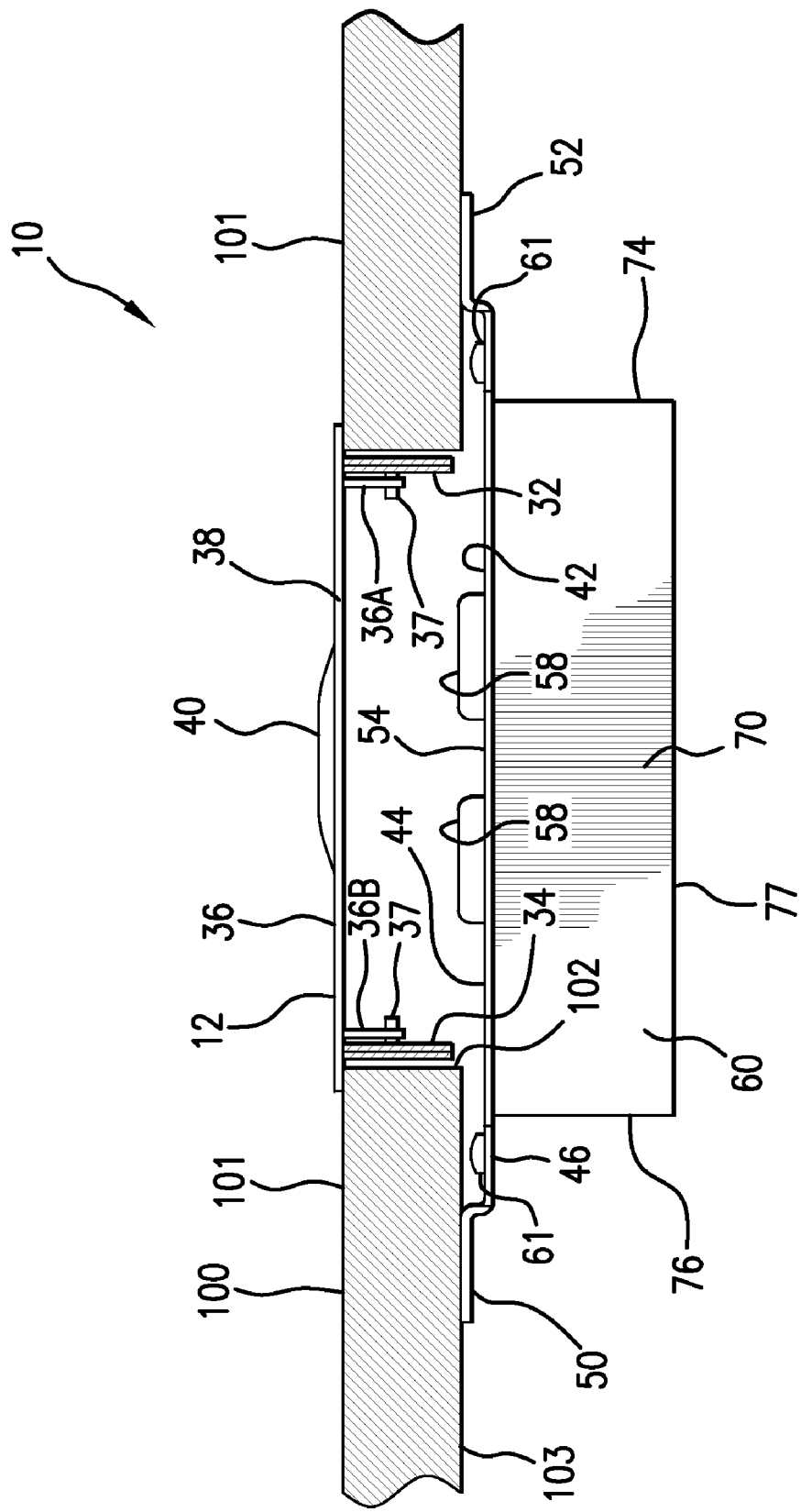
FIG. 14 is a partial cross-sectional view showing the utility receptacle member of the present invention attached to an article of furniture, the view not showing the front and rear walls of the grommet member in order to facilitate viewing of the interior of the grommet member and a recessed section of the receptacle base member.

Referring to FIGS. 1, 2A, 2B and 2C, there is shown utility receptacle apparatus 10 in accordance with one embodiment of the present invention. Utility receptacle apparatus 10 is configured for use with a work surface. Utility receptacle apparatus 10 comprises grommet member 12 and receptacle base member 14. Referring to FIGS. 3-10, grommet member 12 comprises frame structure 16 that comprises opening 18 therein and upper peripheral portion 20 that extends about opening 18. Upper peripheral portion 20 has top side 22 and bottom side 24. Bottom side 24 contacts work surface 101 of article of furniture 100 as shown in FIG. 14. Frame structure 16 further comprises front wall 28, rear wall 30 and sidewalls 32 and 34 that downwardly extend from and are attached to bottom side 24 of peripheral portion 20. Lid member 36 is located within opening 18 and pivotally attached to the rear portions of sidewalls 32 and 34. In one embodiment, lid member 36 has side portions 36A and 36B that are pivotally attached to sidewalls 32 and 34, respectively, by screws 37A and 37B, respectively. This configuration is shown in FIG. 14. As shown in FIG. 8, protruding members 35 extend from sidewalls 32 and 34 to contact and support lid member 36 when lid member 36 is in the closed position. Lid member 36 has front edge 38 which has raised portion 40 to facilitate lifting of lid member 36 by a user. In order to mount grommet member 12 to article of furniture 100, opening 102 is first formed in the work surface 101 of article of furniture 100. Opening 102 extends totally through article of furniture 100 and has a shape that is defined by front wall 28, rear wall 30 and side walls 32 and 34 of frame structure 16, e.g. rectangular, square, etc. The front wall 28, rear wall 30 and sidewalls 32 and 34 of frame structure 16 are then inserted into opening 102 in article of furniture 100. When grommet member 12 is completely mounted to article of furniture 100, bottom side 24 of upper peripheral portion 20 contacts the work surface 101 of article of furniture 100.

Figure 1:
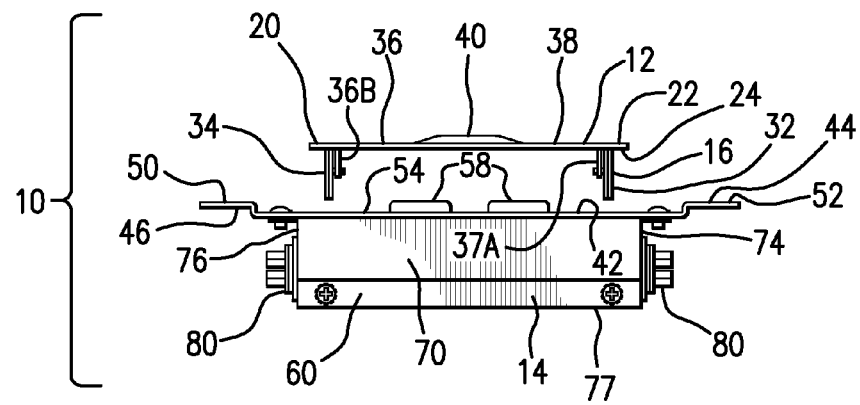
FIG. 1 is an exploded view of a utility receptacle apparatus in accordance with one embodiment of the present invention, the view showing a grommet member and a receptacle base member.
Figure 2A:
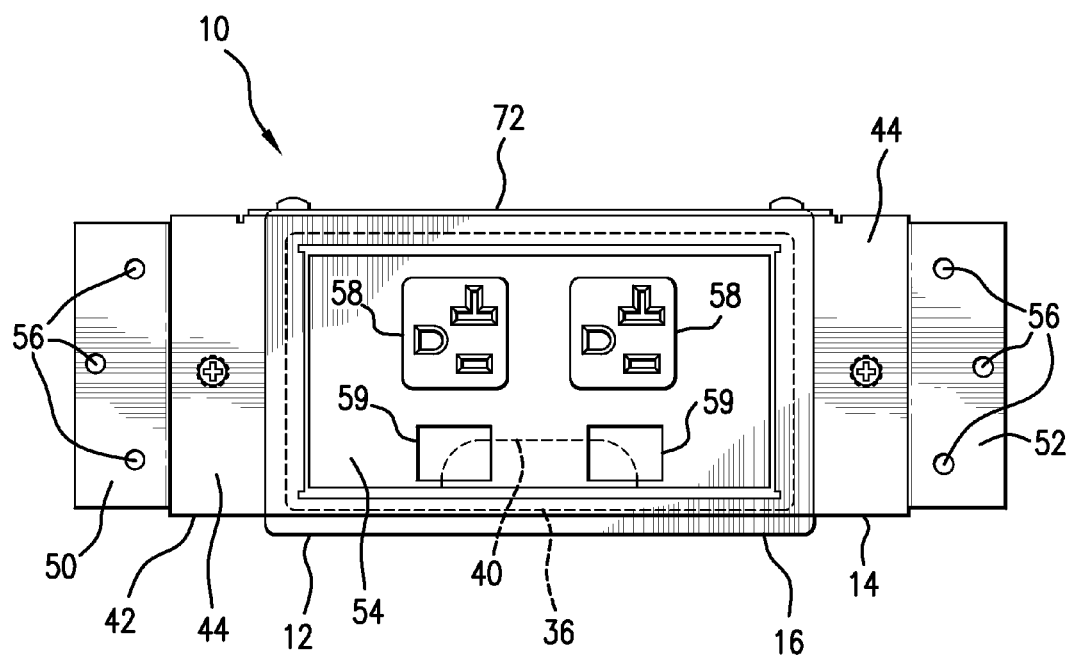
FIG. 2A is top plan view of the utility receptacle apparatus of FIG. 1, the view showing the grommet member in phantom in order to facilitate viewing of utility receptacles of the receptacle base member.
Figure 2B:
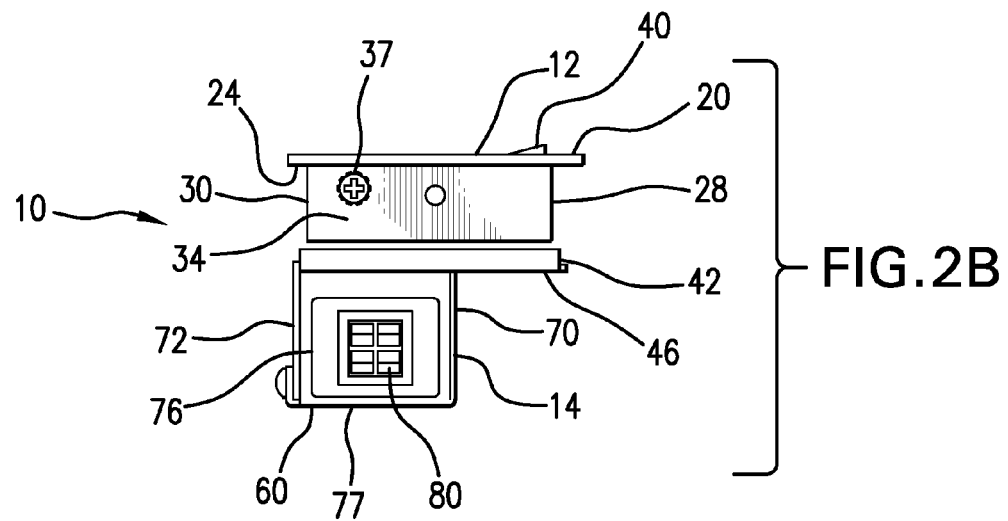
FIG. 2B is an end view of the utility receptacle apparatus of FIG. 1 attached to an article of furniture, the view being that of the right side of the utility receptacle apparatus.
Figure 2C:
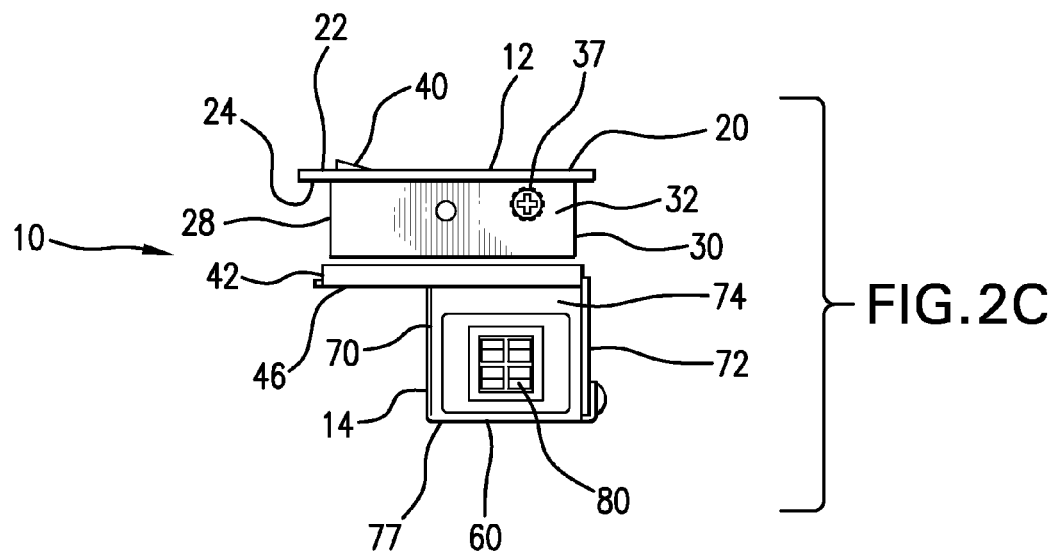
FIG. 2C is an end view of the utility receptacle apparatus of FIG. 1 attached to an article of furniture, the view being that of the left side of the utility receptacle.
Figure 3:
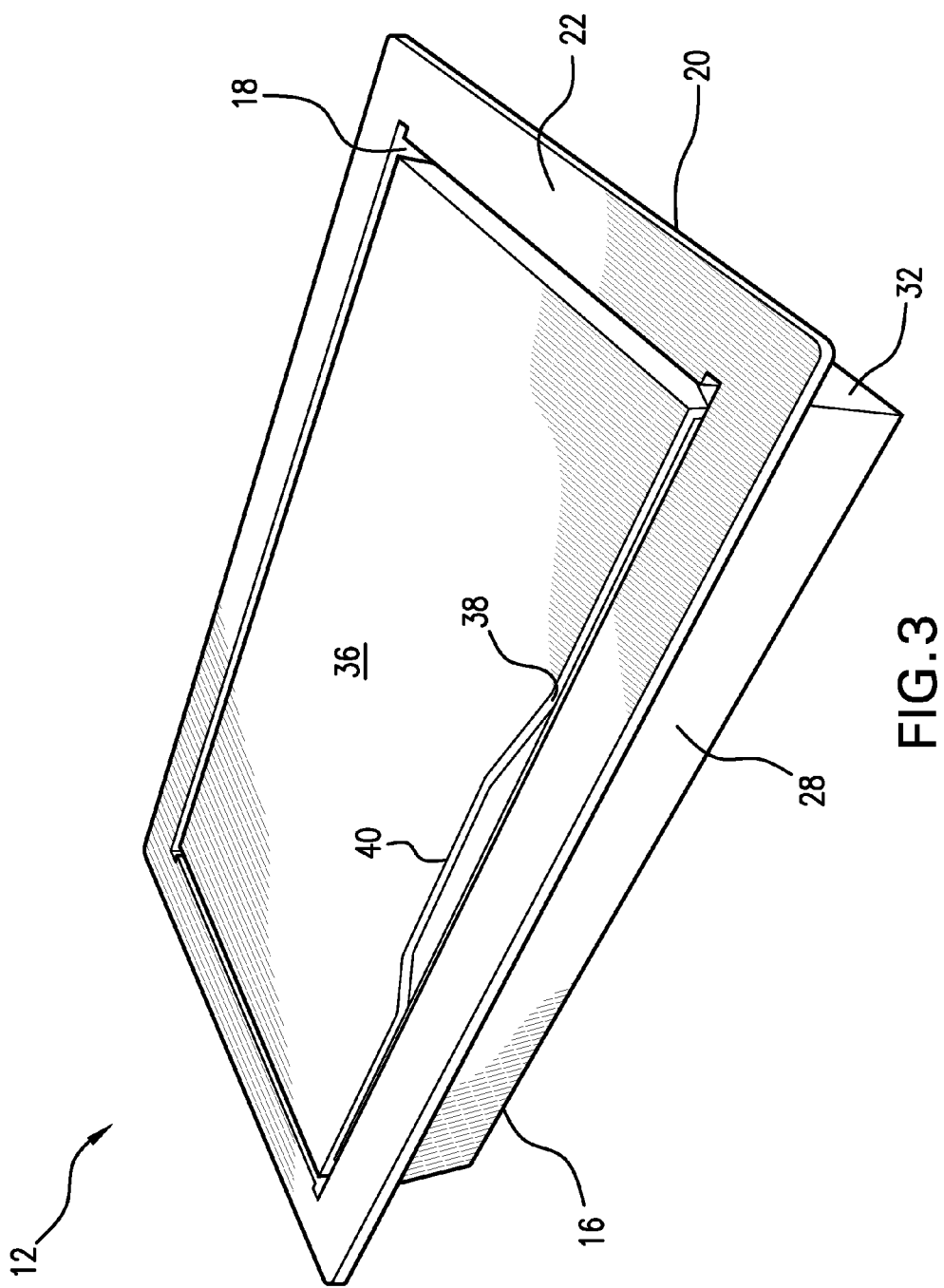
FIG. 3 is a perspective view of the grommet member of the utility receptacle apparatus of FIG. 1.
Figure 4:
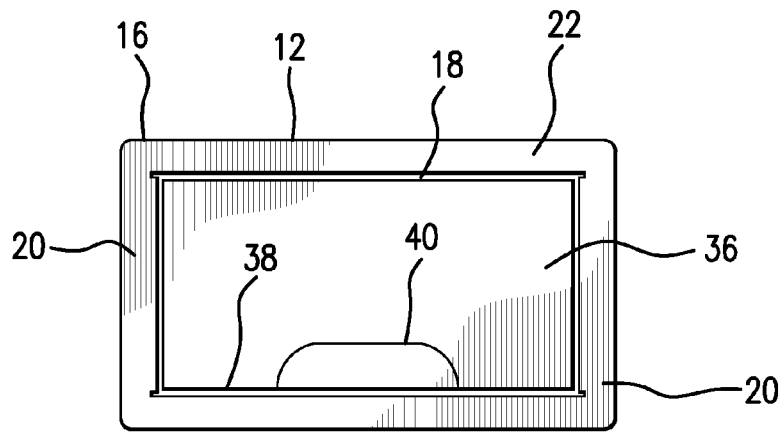
FIG. 4 is a top plan view of the grommet member of FIG. 3, the lid member being shown in the closed position.
Figure 5:
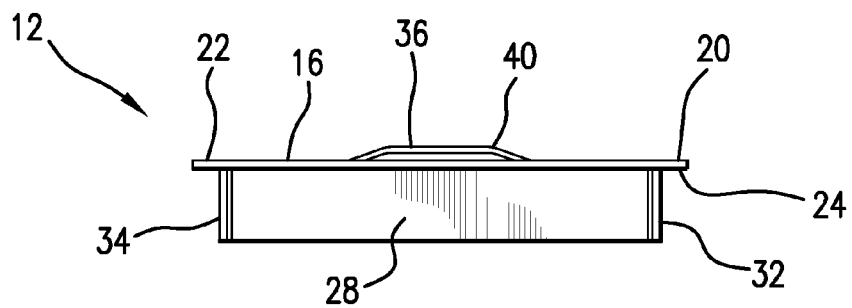
FIG. 5 is a front view of the grommet member of FIG. 3.
Figure 6:
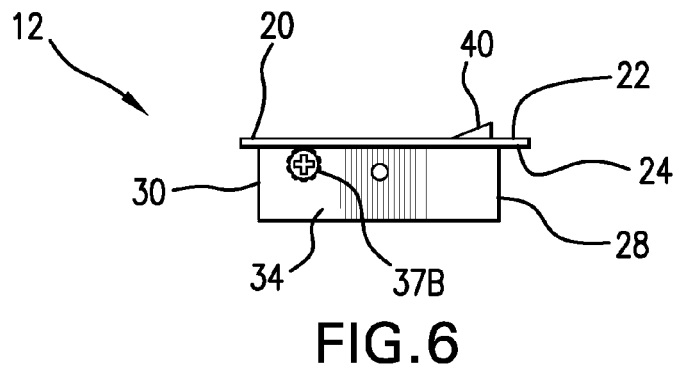
FIG. 6 is a view of the right side of the grommet member of FIG. 3.
Figure 7:
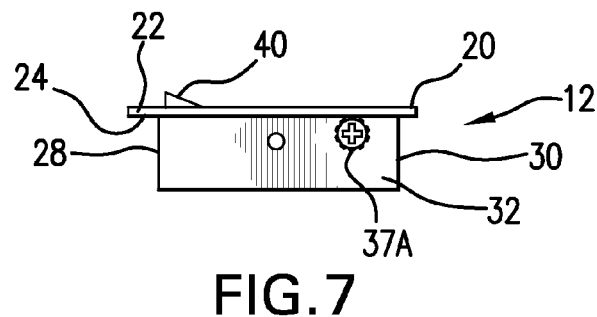
FIG. 7 is a view of the left side of the grommet member of FIG. 3.
Figure 11:
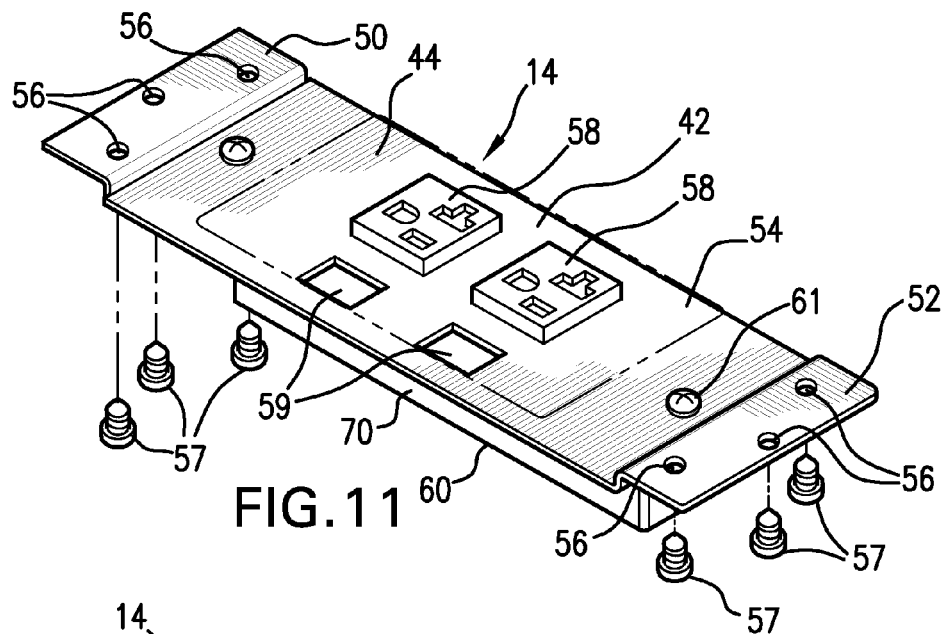
FIG. 11 is a perspective view of the receptacle base member shown in FIG. 1.
Figure 12:
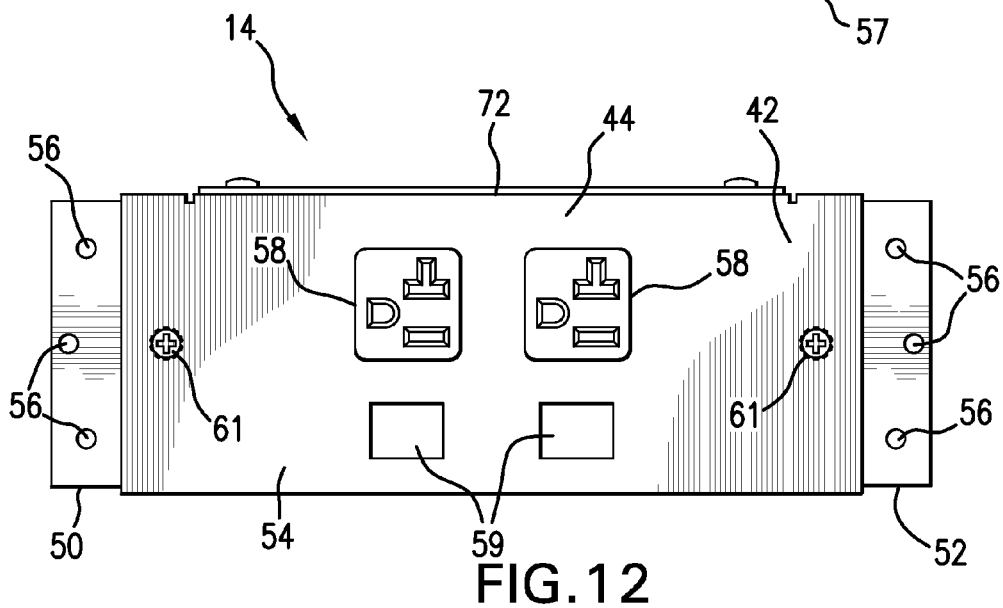
FIG. 12 is top plan view of the receptacle base member of FIG. 1.
Figure 13:
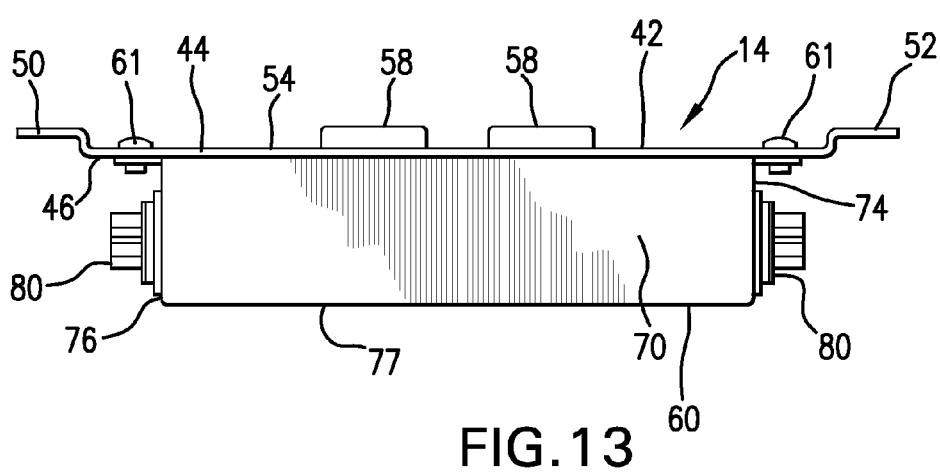
FIG. 13 is a front view of the receptacle base member of FIG. 1.

Referring to FIGS. 1, 2A, 2B, 2C and 13-16, receptacle base member 14 is configured to be attached to article of furniture 100 such that it is below work surface 101 but accessible through opening 102 formed in work surface 101. Receptacle base member 14 comprises top plate section 42 which has top side 44 and bottom side 46. Top plate section 42 comprises a pair of oppositely positioned raised sections 50 and 52, and recessed section 54 that is located between raised sections 50 and 52. Each raised section 50 and 52 has at least one opening 56 therein to receive screws or other suitable fastener devices 57 to allow receptacle base member 14 to be attached to underside 103 of work surface 101. Receptacle base member 14 is mounted to underside 103 in such a manner that recessed section 54 is positioned under opening 102 in work surface 101 of article of furniture 100. Receptacle base member 14 further comprises at least one utility receptacle 58 that is connected to recessed section 54. Utility receptacle 58 is accessible through opening 102 when lid member 36 is in the opened position. Utility receptacle 58 may be configured as a power receptacle that provides electrical power. In one embodiment, there is a plurality of utility receptacles 58 connected to recessed section 54. In the embodiment that is shown in FIG. 2A, utility receptacle 58 is an AC power receptacle and is configured to provide A.C. voltages (e.g. 117 VAC) to power office or laboratory equipment, e.g. personal computers, oscilloscopes, etc. In one embodiment, as shown in FIGS. 2A, 11 and 12, recessed section 54 includes cut-outs 59 that are sized to receive communication receptacles that can provide connection to communication networks such as the internet, broadband, DSL, telephone networks, computer networks, or to receive video and data signals.

In an alternate embodiment, recessed section 54 is configured not to have any cut-outs 59.

Figure 15:
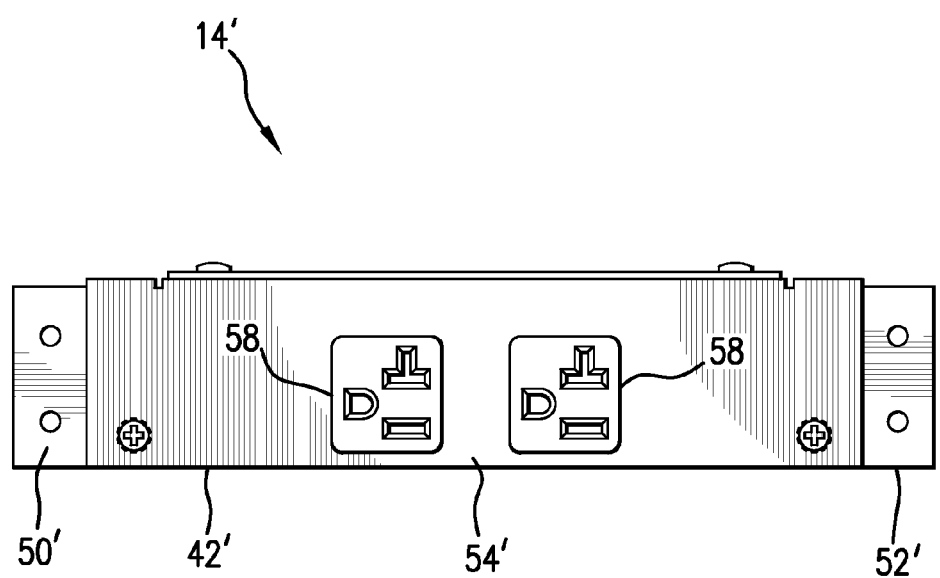
FIG. 15 is top plan view of a receptacle base member in accordance with another embodiment of the present invention.

In an alternate embodiment, utility receptacle apparatus 10 uses only power receptacles and does not use any communication receptacles connected to top plate section 42 (see FIG. 15).

Receptacle base member 14 comprises enclosed member 60 that is attached to bottom side 46 of top plate section 42 with screws 61 or other suitable fastener devices. Enclosed member 60 has front wall 70, rear wall 72, left sidewall 74, right sidewall 76 and bottom panel 77. Enclosed member 60 contains wires and conductors (not shown) that are electrically connected to utility receptacles 58. Referring to FIGS. 1, 2B, 2C and 13, electrical connectors 80 are connected to sidewalls 74 and 76 of enclosed member 60. Like wires of both connectors 80 are connected together. In this embodiment, electrical connectors 80 are configured as Power Pole® conductors manufactured by Anderson Power Products, Inc. of Sterling, Mass. Electrical connectors 80 are connected to a power source (not shown) and deliver power to utility receptacles 58. Having two connectors 80, one of sidewall 74 and one on sidewall 76, allows apparatus 10 to be daisy chained to other apparatuses 10.

In an alternate embodiment, lid member 36 is configured not to have raised portion 40. Instead, lid member 36 has a cut-out that enables a user to insert his or her finger into the cut-out to lift lid member 36. The cut-out also allows wires or cords to pass through the cut-out while the lid member 36 remains closed.

Referring to FIG. 14, utility receptacle apparatus 10 is mounted to an article of furniture 100 such as a work bench, work station, table, desk, etc. Specifically, downwardly extending walls 28, 30, 32 and 34 of grommet member 12 are positioned within opening 102 in work surface 101 and bottom side 24 of peripheral portion 20 contacts the portion of work surface 101 that extends about opening 102. Screws 57 are inserted through corresponding through-holes 56 in raised sections 50 and 52 in order to attach receptacle base member 14 to underside 103 of article of furniture 100. When utility receptacle apparatus 10 is completely mounted to article of furniture 100 and lid member 36 is opened, utility receptacles 58 are accessible through opening 18 in frame structure 16.

In a preferred embodiment, grommet member 12 and receptacle base member 14 are fabricated from metal. However, other suitable materials may be used, e.g. plastic, resins, composites, etc.

Referring to FIG. 15, there is shown a top plan view of receptacle base member 14' is accordance with another embodiment of the invention. Receptacle base member 14' comprises top plate section 42' and has generally the same structure as receptacle base member 14 except that top plate section 42' does not have cut-outs 59. Thus, the width of top plate section 42' is less than the width of top plate section 42 of receptacle base member 14.

Figure 16:
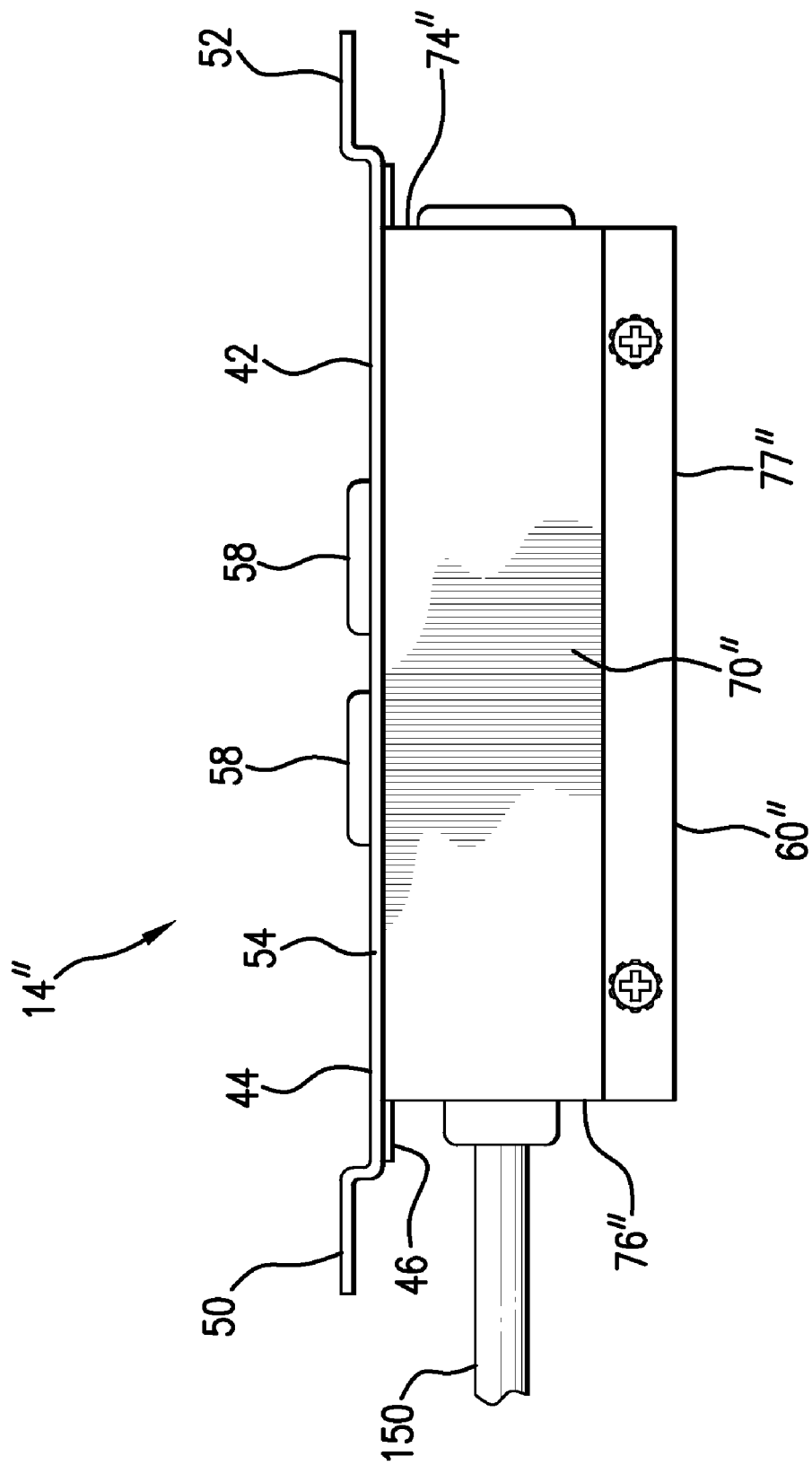
FIG. 16 is a side view of a receptacle base member in accordance with a further embodiment of the present invention.

Referring to FIG. 16, there is shown receptacle base member 14" in accordance with a further embodiment of the present invention. In this embodiment, receptacle base member 14" does not utilize connectors 80 but instead uses a power cord 150 to deliver power to utility receptacles 58. Power cord 150 is plugged into an AC power source (not shown). As shown in FIG. 16, receptacle base member 14" comprises enclosed member 60" that is attached to bottom side 46 of top plate section 42. Receptacle base member 14" also has front wall 70", a rear wall (not shown), left sidewall 74", right sidewall 76" and bottom panel 77". Enclosed member 60" serves the same function as enclosed member 60 of receptacle base member 14 except that sidewalls 74" and 76" are configured without connectors 80. Power cord 150 extends from sidewall 76" and contains wires that are connected utility receptacles 58 and provide electrical power to utility receptacle members 58.

Referring to FIGS. 17-21, there is shown grommet member 200 in accordance with another embodiment of the present invention. Grommet member 200 has generally the same structure as grommet member 12 except that grommet member 200 does not use protruding members 35. Grommet member 200 comprises frame structure 202 that comprises opening 204 therein and upper peripheral portion 206 that extends about opening 204. Upper peripheral portion 206 has top side 210 and a bottom side 211 that contacts work surface 101 of article of furniture 100. Similar to frame structure 16 of grommet member 12, frame structure 202 further has front wall 212, a rear wall (not shown), and sidewalls 214 and 216. Grommet member 200 includes lid member 218 that is located within opening 204 and pivotally attached to sidewalls 214 and 216 in substantially the same manner as lid member 36 is pivotally attached to sidewalls 32 and 34, of frame 16 of grommet member 12. Lid member 218 has cut-out 219 that is sized to receive a finger of a user to allow the user to lift lid member 218. In accordance with this embodiment of the invention, grommet member 200 further comprises brush member 220 that contacts and support lid member 218 when lid member 218 is in the closed position. Brush member 220 comprises an elongate support member 222 and brush bristles 224 that are attached to elongate support member 222. Elongate support member 222 is attached to the inside of front wall 212. In this embodiment, when lid member 218 is closed, lid member 218 contacts and is supported by elongate support member 222. When lid member 218 is closed, brush bristles 224 are located within cut-out 219.

Since brush bristles 224 are soft and movable, wires or power cords can pass through brush bristles 224 while lid member 218 is closed.

It is to be understood that the invention is not limited to the illustrations described and shown herein, which are deemed to be merely illustrative of the best modes of carrying out the invention, and which are susceptible of modification of form, size, arrangement or position of parts, and details of operation. Rather, the invention is intended to encompass all such modifications which are within the spirit and scope as defined by the claims.

What is claimed is:

1. A utility receptacle apparatus for use with a work surface, comprising:
    a grommet member comprising a frame structure that comprises an opening therein and an upper peripheral portion that extends about the central opening, the upper peripheral portion having a top side and bottom side wherein the bottom side has a surface for contacting a work surface of an article of furniture, the grommet member further comprising front and rear walls and sidewalls that extend downward from and are attached to the bottom side of the peripheral portion; and
    a receptacle base member comprising a top plate section which has a top side and a bottom side, the top plate section comprising a pair of oppositely positioned raised sections and a recessed section that is located between the raised sections, each raised section has at least one opening therein to receive a fastener device to allow the receptacle base member to be attached under a work surface of an article of furniture, the receptacle base member further comprising at least one utility receptacle that is connected to the recessed section, the receptacle base member comprising an enclosed member that is attached to the bottom side of the top plate section and which has front and rear walls, a left sidewall and a right sidewall, the enclosed member being sized to contains wires and conductors that are electrically connected to the at least one utility receptacle.

2. The utility receptacle apparatus according to claim 1 wherein the grommet member further includes a lid member that is located within the opening of the frame structure and movably attached to the side walls of the frame structure.

3. The utility receptacle apparatus according to claim 2 wherein the lid member has a front edge which has a raised portion to facilitate lifting of the lid member by a user.

4. The utility receptacle apparatus according to claim 2 wherein the lid member has a cut-out sized to receive a user's finger to enable the user to raise the lid member.

5. The utility receptacle apparatus according to claim 1 wherein the frame structure includes at least one protruding member extending from one of the sidewalls to contact and support the lid member when the lid member is in the closed position.

6. The utility receptacle apparatus according to claim 1 wherein the front wall of the frame structure has an inside surface located within the opening of the frame, and wherein the grommet member includes a brush member, the brush member further comprising an elongate member attached to the inside surface and brush bristles that are attached to and extend from the elongate member, the elongate member supporting the lid member when the lid member is in the closed position.

7. The utility receptacle apparatus according to claim 1 wherein the at least one utility receptacle comprises a plurality of utility receptacles.

8. The utility receptacle apparatus according to claim 1 further comprising an electrical connector connected to one of the sidewalls of the enclosed member, the electrical connector including wires that are electrically connected to the at least one utility receptacle, the electrical connector being configured to be connected to a source of electrical power.

9. The utility receptacle apparatus according to claim 8 further comprising an additional electrical connector attached to the other sidewall of the enclosed member, the additional electrical connector being electrically connected to the other electrical connector so as to allow the utility receptacle apparatus to be connected to other utility receptacle apparatuses in a daisy chain configuration.

10. The utility receptacle apparatus according to claim 1 further comprising a power cord connected to the enclosed member of the receptacle base member, the power cord comprising wires that are electrically connected to the at least one utility receptacle, the power cord being configured to be connected to a source of electrical power.

11. The utility receptacle apparatus according to claim 1 wherein the recessed section of the top plate section has at least one cut-out for receiving a communication receptacle.

12. The utility receptacle apparatus according to claim 1 wherein the at least one utility receptacle is a power receptacle and the utility receptacle apparatus further comprises means for providing electrical power to the power receptacle.

13. The utility receptacle apparatus according to claim 1 further comprising at least one communication receptacle connected to the top plate section of the receptacle base member.

14. A utility receptacle apparatus for use with a work surface of an article of furniture, the article of furniture having an opening in the work surface and an underside that is beneath the work surface, the utility receptacle apparatus comprising:

a grommet member comprising a frame structure that comprises an opening therein and an upper peripheral portion that extends about the central opening, the upper peripheral portion having a top side and bottom side wherein the bottom side has a surface for contacting the work surface of the article of furniture, the grommet member further comprising a front wall, a rear wall and a pair of sidewalls that extend downward from and are attached to the bottom side of the peripheral portion, the front wall, rear wall and sidewalls of the frame structure being inserted into the opening in the work surface such that the surface of the bottom side of the upper peripheral portion contacts the portion of the work surface that extends about the opening in the article of furniture;

a receptacle base member comprising a top plate section which has a top side and a bottom side, the top plate section comprising a pair of oppositely positioned raised sections and a recessed section that is located between the raised sections, the receptacle base member further comprising at least one utility receptacle that is connected to the recessed section, the receptacle base member comprising an enclosed member that is attached to the bottom side of the top plate section, the enclosed member having front and rear walls, a left sidewall and a right sidewall, the enclosed member being sized to contains wires that are electrically connected to the at least one utility receptacle;

means for attaching the receptacle base member to the underside of the work surface of the article of furniture such that the recessed section is positioned under the opening in the work surface and the at least one utility receptacle is accessible through the opening in the frame structure of the grommet member; and a lid member that is located within the opening of the frame structure of the grommet member and movably attached to the sidewalls of the frame structure, the lid member being movable between a closed position that covers the at least one utility receptacle and an opened position to provide access to the at least one utility receptacle.

15. The utility receptacle apparatus according to claim 14 further comprising at least one communication receptacle connected to the top plate section of the receptacle base member.

16. The utility receptacle apparatus according to claim 15 wherein the at least one utility receptacle comprises a power receptacle and the utility receptacle apparatus further comprises means for providing electrical power to the power receptacle.

17. The utility receptacle apparatus according to claim 14 further comprising means for contacting and supporting the lid member when the lid member is in the closed position.

\* \* \* \* \*